United States Patent Office
3,261,806
Patented July 19, 1966

3,261,806
VINYL CHLORIDE RESINS CONTAINING A TRIALKYL LEAD PHTHALIMIDE AS A STABILIZER
Richard D. Gorsich, Baton Rouge, La., assignor to Ethyl Corporation, New York, N.Y., a corporation of Virginia
No Drawing. Filed May 31, 1963, Ser. No. 284,341
9 Claims. (Cl. 260—45.75)

This invention concerns thermal stabilization of haloethylene polymers. More particularly, it relates to new compositions based on haloethylene polymers, in particular vinyl chloride resins, having improved thermal stability over the prior known compositions.

It is known that haloethylene polymers such as polyvinyl chloride and the copolymers of vinyl chloride and vinylidene chloride undergo appreciable degradation and darkening when heated during thermal fabrication operations and when the fabricated articles are exposed for prolonged periods to elevated temperatures. During the formation of resins into plastic sheets, rigid bodies and the like, the materials are worked at high temperatures. High temperature working of the material facilitates the forming operation and decreases the time during which hot work is needed, increasing the capacity of the equipment. However such high temperature working results in the rapid deterioration of the resin. This is evidenced by a yellowing and then a progressive darkening of the material. The initial color transparent stock turning, in stages, yellow, tan, and then brown, black and opaque. Such thermal sensitivity has seriously limited the applications in which these haloethylene polymers may be employed. One of the common means for alleviating this degradation has been to employ certain additives as heat stabilizers in the polymer formations. However, the requirements of a suitable heat stabilizer are manifold and varied. To be suitable for commercial use, the stabilizers must be compatible in the resin, must have a minimum of plateout during milling, and must retard the deteriorative effects of heat and light. The most desirable resins are those that are initially clear and transparent and retain this condition for the longest period of time. The onset of a distinct yellow cast to a transparent stabilized resin is an indication of the limit of usefulness of the resin.

Several lead compounds, e.g. lead stearate and lead phthalate, are recognized by the art to have suitable stabilization properties however the lead compounds in general are known to have drawbacks particularly because of their possible reactivity with the resin, plasticizers, and other compound ingredients. Also the commercial lead stabilized are in general incompatible with the resin and results in opaque material. Due to these disadvantages particularly the opacity of the resins the present use of lead compounds is restricted to electrical insulation and the like. There is however a need in the art for lead compounds which are compatible with the resin and which results in resins that are clear and transparent dut to the fact that lead compounds in general are cheaper and more readily available than other compounds presently in commercial use.

Accordingly, it is the chief object of this invention to provide novel stabilized halogen containing resins, particularly vinyl chloride resins stabilized with particular lead compounds.

It is a further object of this invention to provide vinyl chloride resins containing certain lead compounds which are clear and transparent and which retain this condition for extended periods of time.

It is a further object of this invention to provide a process for the production of vinyl chloride resins having improved stability.

Other objects and advantages will become more apparent from the following description.

The above and related objects are accomplished by a vinyl chloride resin stabilized against discoloration by having incorporated therein a trialkyl lead phthalimide in an amount sufficient to stabilize the resin against discoloration, said trialkyl lead phthalimide having from 1 to about 5 carbon atoms in each alkyl group and more preferably from 1 to about 3 carbon atoms. Trimethyllead phthalimide is particularly preferred due to the excellent results achieved therewith. Alkyl radicals having a greater number of carbon atoms may, of course, be employed however the alkyl radicals outside the aforementioned ranges merely increase the cost without incurring any additional benefits.

Particularly preferred resins are polyvinyl chloride and vinyl chloride copolymers.

The lead compounds of this invention show stabilizing effectiveness in any concentration and are particularly effective when used in an amount ranging from about 0.01 to 10 percent, and more preferably from 1.5 to 5 percent, by weight based on the weight of the resin or polymer. When more than 10 percent is used, the stabilizers become economically unattractive and no additional benefits accrue.

In addition to imparting thermal stability to the resin and compatibility with the resin these compounds possess the additional advantages in that they are colorless and odorless. Articles prepared from these compounds are more merchantable than those prepared from many of the known compositions due to their absence of odor.

The stabilizers of this invention may be employed with other common additives used in haloethylene polymer formulations without any adverse effect resulting therefrom. Typical of such additives are light stabilizers, fillers, pigments and dyes.

These stabilizers may be incorporated into the polymer formulations by any known blending technique, such as milling and dry blending. It is preferred that the lead compound be in a finely comminuted state for blending purposes to achieve uniform dispersion of the salt through the formulation more easily.

By way of example and comparison several sample compositions were prepared. A formulation of 1 part by weight of each particular stabilizer and 50 parts by weight of di-2-ethyl-hexyl phthalate (DOP) were handmixed in 250 mil glass beakers. 50 parts of polyvinyl chloride were then stirred into each of the above described formulations and the resulting plastisols were deaerated for 17 hours in a vacuum desiccator at room temperature. The formulations were then poured into a six-inch by three-inch by one-sixteenth inch chase enclosed between 2 polished, chrome plated steel sheets, weighted with a 3,550 gram load and fused for 30 minutes at 177° C. in a circulating air oven. The molded sheets were examined visibly for compatibility and stability. The results are listed in the following table.

TABLE I

| Run | Stabilizer | Compatibility | Stability |
|---|---|---|---|
| I | Lead Phthalate | Opaque | Slight yellow tinge. |
| II | Ba-Cd-Zn Soap | Transparent | White. |
| III | Trimethyl Lead Phthalimide | ___do___ | Do. |
| IV | Triethyl Lead Stearate | Opaque, filled with large bubbles. | Do. |
| V | Triethyl Lead Benzene Phosphonate. | Opaque, filled with small bubbles. | Tan. |
| VI | Triethyl Lead Glycollate Phenyl Urethane. | Transparent, filled with small bubbles. | Light yellow. |

The above results demonstrate that the trimethyllead phthalimide of the present invention initially produces a transparent clear resin whereas the lead phthalate which is now in commercial use produces an opaque resin which shows slight yellowing. Also it is noted that the trimethyllead phthalimide shows qualities which are at least equal to Ba-Cd-Zn soap which is widely used as a commercial stabilizer.

The molded sheets described above were next evaluated for thermal stability by cutting them into numerous three-quarter inch by three-quarter inch squares, placing these samples on aluminum foil strips in a 175° C. circulating oven and removing sets of samples every 15 minutes for 2 hours. These samples were then mounted on display cards for direct visual comparison. The results are summarized in the table below.

TABLE II
[Heating Conducted at 175° C.]

| Run | Stabilizer | ¼ Hour | ½ Hour |
|---|---|---|---|
| I | Lead Phthalate | Opaque, slight yellow tinge | Opaque, slight yellow tinge. |
| II | Ba-Cd-Zn Soap | Transparent, white | Transparent, yellow. |
| III | Trimethyl Lead Phthalimide | ___do___ | Transparent, brown tinge. |
| IV | Triethyl Lead Stearate | Opaque, filled with large bubbles, light brown. | Opaque, filled with large bubbles, brown. |
| V | Triethyl Lead Benzene Phosphonate. | Opaque, filled with small bubbles, tan. | Opaque, filled with small bubbles, tan. |
| VI | Triethyl Lead Glycollate Phenyl Urethane. | Transparent, filled with small bubbles, tan. | Transparent, filled with small bubbles, dark brown. |

It is seen from the foregoing table that trimethyllead phthalimide shows equal thermal stability to the barium-cadmium-zinc soap and highly superior qualities particularly in clarity to the lead phthalate.

Similar results are achieved when the above runs are repeated using triethyl lead phthalimide, tripropyl lead phthalimide, tripentyl lead phthalimide, trioctyl lead phthalimide, methylethyl-isopropyl lead phthalimide. The runs are also repeated using the diethyl ester of adipic acid and the diisopropyl ester of azelaic acid as plasticizers.

When the above runs are repeated using the copolymers of vinyl chloride and vinylidene chloride and vinyl chloride and vinyl acetate similar compatability and thermal stability is observed.

Generally speaking, the halogen-containing resins, which are rendered heat and light resistent by the stabilizers of this invention, are polymers of vinyl chloride and vinyl resins containing vinyl chloride units in the structure, such as copolymers of vinyl chloride with vinyl esters of aliphatic carboxylic acids, particularly vinyl acetate, copolymers of vinyl chloride with esters, nitriles and amides of unsaturated carboxylic acids, e.g. of acrylic and methacrylic acids, copolymers of vinyl chloride with diene compounds and with unsaturated dicarboxylic acids or in anhydrides, such as copolymers of vinyl chloride with diethyl maleate, diethyl fumarate, or maleic anhydride, after-chlorinated polymers and copolymers of vinyl chloride, polymers of vinylidene chloride and copolymers of the same with vinyl chloride and other polymerizable compounds; polymers of vinyl chloracetate and dichlorodivinyl ether; chlorinated polymers of vinyl acetate, chlorinated polymeric esters of acrylic and acrylic alpha-substituted acrylic acids; polymers of chlorinated styrenes, for instance, dichlorostyrene, chlorinated rubber, chlorinated polymers of ethylene, polymers and after-chlorinated polymers of chlorobutadiene, and their copolymers with vinyl chloride; rubber hydrochloride and chlorinated rubber hydrochloride, and mixtures of the polymers recited herein with each other polymerizable compound.

The stabilizers of the present invention are also effective stabilizers for organosols and plastisols. Plasticizers commonly used in plasticized resins, organosols and plastisols include esters of the following acids: phthalic acid, adipic acid, subacic acid, azelaic acid, citric acid, aconitric acid, tricarboxylic acid, maleic acid, fumaric acid, succinic acid, phosphoric acid and mercapto acids like thioglycolic acids and the like; esters of dihydric and polyhydric alcohol, such as glycol, glycerol, pentaerythritol, sorbitol, and the like; esters of thioglycols and other sulfur-containing derivatives; amino alcohol derivatives; ester amides, sulfonamides, and other amides, chlorinated plasticizers and carbonic acid derivatives derived from phosgene.

The stabilizers of this invention are useful with halogen containing resins having incorporated therein other stabilizers and other plasticizers.

While the invention has been described with particular reference to specific embodiments, it is to be understood that it is not limited thereto but is to be construed broadly and is to be restricted solely by the scope of the appended claims.

What I claim is as follows:

1. A vinyl chloride resin stabilized against discoloration by having incorporated therein a trialkyl lead phthalimide in an amount sufficient to stabilize the resin against discoloration, said trialkyl lead phthalimide having from 1 to about 5 carbon atoms in each alkyl group.

2. A composition as defined in claim 1 in which the resin is a vinyl chloride copolymer.

3. A composition as defined in claim 1 in which the resin is polyvinyl chloride.

4. A composition as defined by claim 1 wherein the concentration of trialkyl lead phthalimide is from about 0.01 percent to about 10 percent based on the total weight of the resin.

5. A composition as defined by claim 1 wherein the concentration of trialkyl lead phthalimide is from about 1.5 to about 5 percent based on the total weight of the resin.

6. A composition as defined by claim 1 wherein the concentration of trialkyl lead phthalimide is about 2 percent based on the total weight of the resin.

7. A composition as defined by claim 1 wherein the trialkyl lead phthalimide is trimethyl lead phthalimide.

8. A composition of matter comprising polyvinyl chloride resin having incorporated therein from about 0.01 to about 10 percent of trimethyl lead phthalimide.

9. A composition of matter comprising polyvinyl chloride resin having incorporated therein from about 1.5 to 5 percent of trimethyl lead phthalimide based on the total weight of the resin.

References Cited by the Examiner
UNITED STATES PATENTS

| | | | |
|---|---|---|---|
| 2,574,987 | 11/1951 | Shelley | 260—45.8 |
| 2,608,547 | 8/1952 | Hendricks et al. | 260—45.75 |

LEON J. BERCOVITZ, *Primary Examiner.*

G. W. RAUCHFUSS, *Assistant Examiner.*